(12) United States Patent
Astely et al.

(10) Patent No.: US 7,986,681 B2
(45) Date of Patent: Jul. 26, 2011

(54) SUBFRAMES IN A CELLULAR COMMUNICATIONS SYSTEM

(75) Inventors: David Astely, Bromma (SE); Stefan Parkvall, Stockholm (SE); Per Johan Anders Nyström, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 108 days.

(21) Appl. No.: 12/047,921

(22) Filed: Mar. 13, 2008

(65) Prior Publication Data

US 2009/0073902 A1 Mar. 19, 2009

(51) Int. Cl.
*H04W 4/00* (2009.01)

(52) U.S. Cl. .......... 370/341; 370/252; 370/255

(58) Field of Classification Search ........... 370/280, 370/335, 337, 329, 209, 229, 235, 341, 252, 370/254, 255; 455/345; 709/238, 241, 242
See application file for complete search history.

(56) References Cited

U.S. PATENT DOCUMENTS

| 2004/0264431 | A1  | 12/2004 | Rhodes |         |
|--------------|-----|---------|--------|---------|
| 2007/0280098 | A1* | 12/2007 | Bhatt et al. | 370/208 |
| 2008/0123569 | A1* | 5/2008  | Doss et al.  | 370/280 |
| 2008/0137562 | A1* | 6/2008  | Li et al.    | 370/280 |
| 2008/0144530 | A1* | 6/2008  | Che et al.   | 370/254 |
| 2008/0304404 | A1* | 12/2008 | Lu et al.    | 370/210 |

FOREIGN PATENT DOCUMENTS

| CN | 101005305 A    | 7/2007  |
|----|----------------|---------|
| EP | 1511190 A1     | 3/2005  |
| EP | 1746743 A1     | 1/2007  |
| WO | WO 2005/109705 A1 | 11/2005 |

OTHER PUBLICATIONS

International Search Report issued on Dec. 11, 2008 in corresponding International Application No. PCT/SE2008/050276.
Catt et al., "Numerology and Frame Structure of EUTRA TDD based on OFDMA and text proposal for TR 25.814" 3GPP TSG RAN WG1#42bis, San Diego, USA, Oct. 10-14, 2005, pp. 1-10, XP050100834.
Extended European Search Report issued in EP 08 72 4223, dated Jan. 12, 2011.

* cited by examiner

*Primary Examiner* — Chi Pham
*Assistant Examiner* — Weibin Huang
(74) *Attorney, Agent, or Firm* — Potomac Patent Group PLLC

(57) ABSTRACT

The invention discloses a method for a cellular communications system, in which traffic is sent in frames, each frame comprising a first number of subframes, with a second number of said subframes being available for at least either uplink or downlink traffic. At least one of said second number of subframes is made to comprise at least three parts, as follows:
One part which is utilized for uplink traffic,
One part which is utilized for downlink traffic,
One part which is utilized as a guard period,
with said guard period part being scheduled between the uplink and the downlink parts. The duration of at least two of said three parts may be varied to fit the current system need.

22 Claims, 7 Drawing Sheets

SUBFRAMES IN A CELLULAR COMMUNICATIONS SYSTEM

TECHNICAL FIELD

The present invention discloses a method for use in a cellular communications system, in which system the traffic in a cell is sent in frames. Each frame comprises a first number of subframes, and a second number of said subframes is available for at least either uplink or downlink traffic.

BACKGROUND

In cellular wireless systems, both current systems such as, for example, UTRA (UMTS Terrestrial Radio Access) systems, and future systems such as the LTE (Long Term Evolution) systems, a principle which is used is so called TDD, Time Division Duplex, i.e. a principle according to which uplink and downlink traffic occur during different periods of time, so called subframes, which are comprised in a larger frame. Usually, in a TDD system, the uplink and downlink traffic use the same carrier frequency.

Due to the fact that uplink and downlink traffic share one and the same frequency in a TDD system, interference problems may occur between different cells in the system. In particular, downlink traffic from one cell may cause interference in other cells.

In addition to interference between different cells in one and the same TDD system, interference may also occur between different cells in different but co-located or adjoining systems, for example systems which are run by different operators.

One way of reducing the problems of inter-cell interference in TDD systems is to arrange so called "guard periods" at the transitions between downlink and uplink traffic, i.e. periods during which no traffic may occur. Guard periods may also be arranged at transitions from uplink to downlink.

Co-existence, i.e. the ability to avoid interference between cells in one and the same system, as well as between cells of adjoining or co-located cells of different systems, is an important factor.

However, the frame structures in some current UTRA and LTE TDD standards offer limited co-existence opportunities. To make efficient co-existence possible, the frame structure should preferably make it possible to have a large flexibility when it comes to configuring it to overcome interference problems, both interference from cells in the "own" system as well as from cells in co-located or adjoining cells of other systems.

SUMMARY

As has emerged from the description above, there is thus a need for a solution by means of which increased coexistence in the form of reduced risk of interference between cells of one and the same or different wireless cellular systems can be increased, in particular in systems which use the TDD principle.

Such a solution is offered by the present invention in that it discloses a method for use in a cellular communications system, in which system the traffic is sent in frames, with each frame comprising a first number of subframes and with a second number of subframes being available for at least either uplink or downlink traffic.

According to the method of the invention, at least one of the second number of subframes is made to comprise at least three parts, as follows:

One part which is utilized for uplink traffic,
One part which is utilized for downlink traffic,
One part which is utilized as a guard period.

The guard period part is placed between the uplink and the downlink parts, and according to the invention, the duration of at least two of said three parts may be varied to fit the current system need.

Thus, the present invention offers a solution by means of which a subframe may be made to comprise a guard period of varying length, so that it can be suited to overcome the interference problems of a specific system, and so that the remaining part of the subframe can be made to comprise uplink and downlink traffic in varying proportions, since, according to the invention, the remaining part can be divided between the uplink and downlink directions, thus ensuring maximum efficiency regarding the use of the available resources.

The inventive method can in one embodiment be applied to a system which uses so called TDD, Time Division Duplex, i.e. a system with a so called unpaired spectrum, in which uplink and down link traffic in at least a first plurality of cells in the system occur during different subframes, but on the same frequency. In another embodiment, the inventive method may also be applied to a system which uses so called half duplex FDD, Frequency Division Duplex, so that uplink and down link traffic for one and the same user in at least a first number of cells in the system occur during different subframes, and on different frequencies.

Suitably, a subframe of the invention is placed at a transition between uplink and downlink, either at a transition from downlink to uplink, or at a transition from uplink to downlink.

The invention also discloses a transceiver for use as a controlling node in a cell of a system of the invention, and a transceiver for use as a user terminal in a system of the invention.

BRIEF DESCRIPTION OF THE DRAWINGS

The invention will be described in more detail in the following, with reference to the appended drawings, in which.

DETAILED DESCRIPTION

Figure 1:
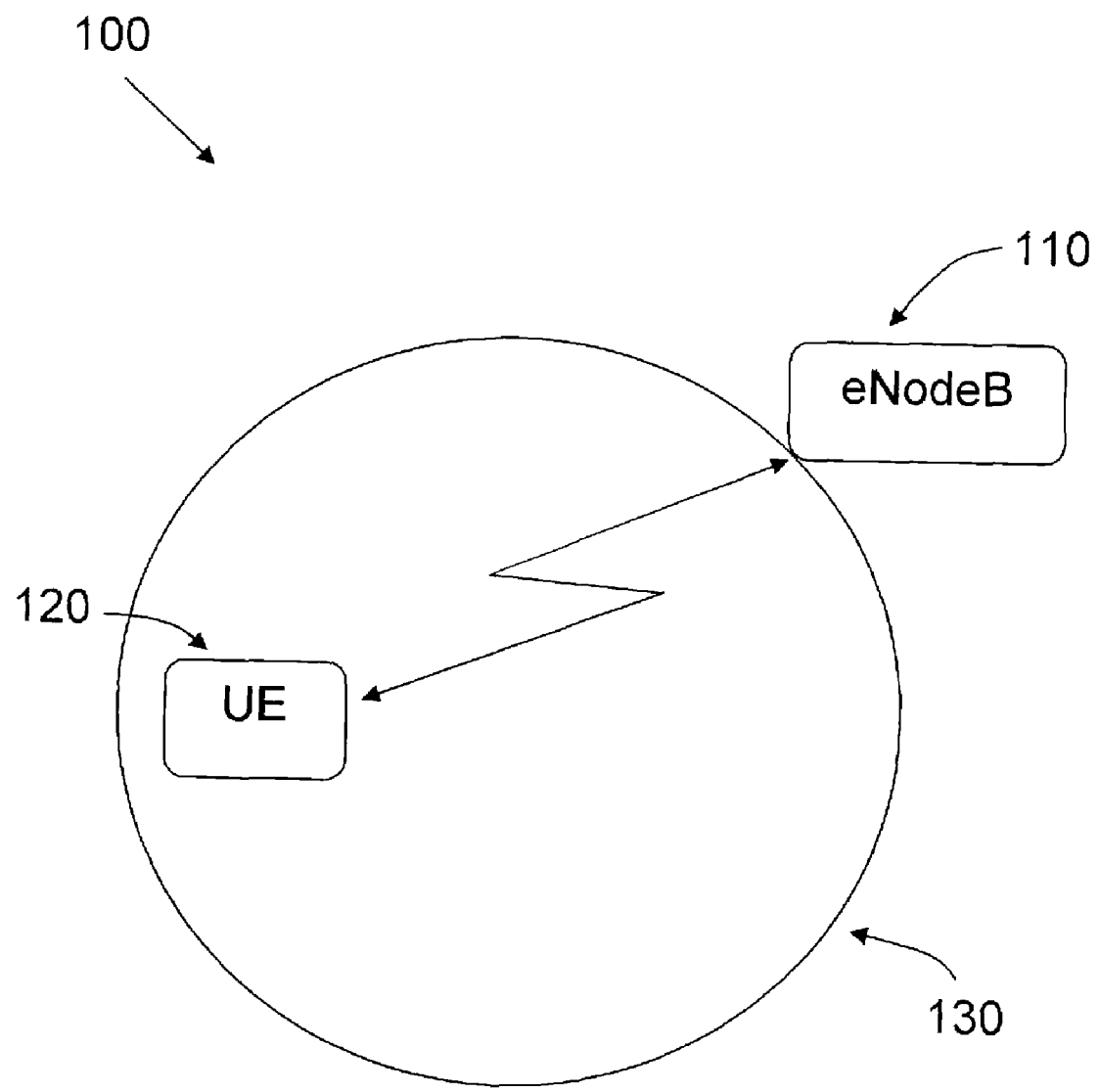
FIG. 1 shows a schematic view of a system in which the invention may be applied.

FIG. 1 shows a schematic view of a wireless cellular system 100 in which the present invention may be applied. The invention will in the following be described with terms from so called LTE systems (Long Term Evolution), but it should be pointed out that this should not be construed as limiting the scope of protection sought for the present invention, the LTE terminology is merely used in order to facilitate the reader's understanding of the present invention, the invention can be used in other types of wireless cellular systems as well.

In addition, the word "traffic" is used in this text. It should be pointed out that the word "traffic" in this text is taken to mean all communication that is sent in downlink and uplink, e.g. both so called "payload data" and control signals, etc.

Returning now to the system 100 shown in FIG. 1, the system comprises a number of cells one of which is shown as 130 in FIG. 1. A cell in the system can accommodate a number of users, one of which is shown as 120 in FIG. 1, and, using LTE terminology, the user is shown as a "UE", User Equipment.

In the system 100, there is also a controlling node, shown as 110 in FIG. 1, which has as one of its functions to control the traffic to and from the UEs 120 in the cell 130. The controlling node is in LTE known as "eNodeB", evolved NodeB.

Traffic from the UEs 120 to the eNodeB 110 is known as uplink traffic, UL, and traffic from the eNodeB to the UEs is known as downlink traffic, DL.

Figure 2:
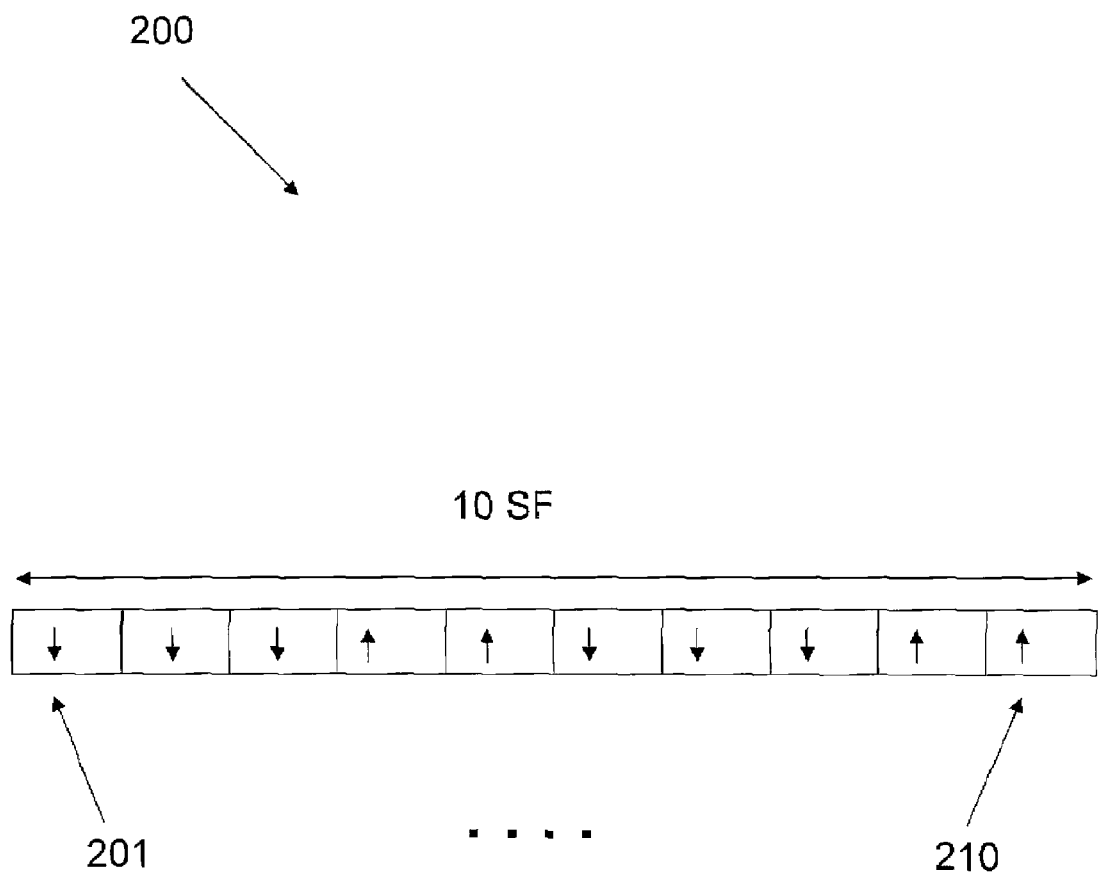
FIGS. 2 and 3 show prior art frames.

Both UL and DL traffic is sent in so called frames, and an LTE TDD system at present has two different frame structures, known as type 1 and type 2. Type 1 will be described with reference to FIGS. 2 and 3: as shown in FIG. 2, one frame of Type 1 comprises 10 so called subframes, SF, shown as 201-210.

As indicated with arrows in the subframes 201-210, a subframe can be used either for DL or UL traffic. However, as has also been indicated previously, in systems in which a multitude of cells are synchronized with respect to which subframes that are used for UL or DL, at, for example, a transition from DL to UL, inter-cell interference can be caused in neighboring cells by "lingering" DL traffic.

Figure 3:
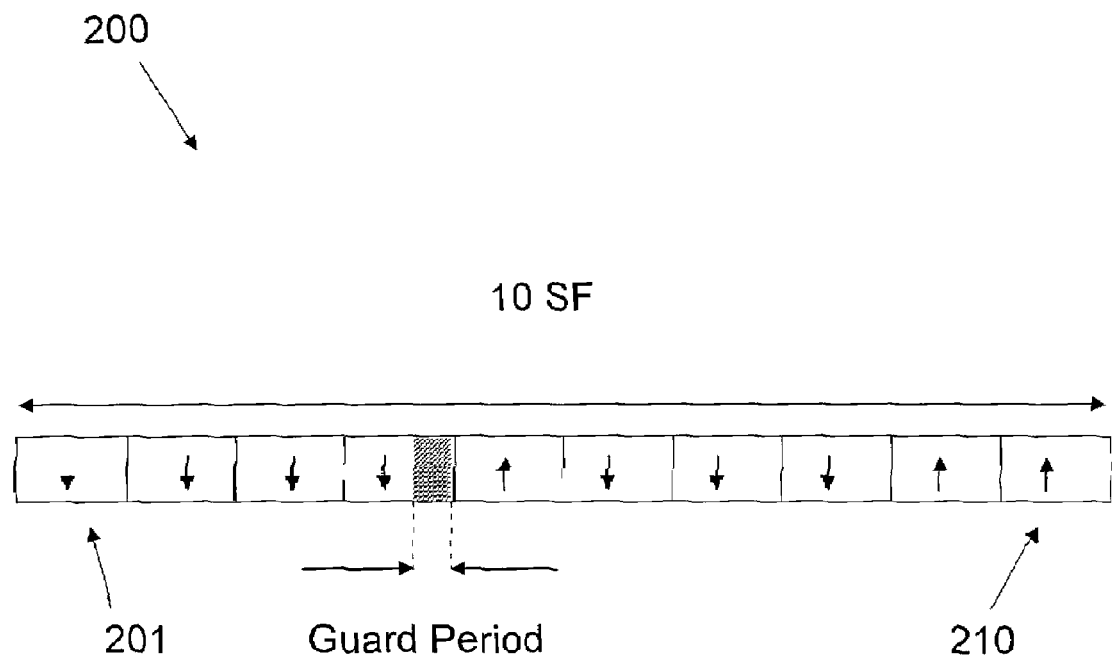

Such interference can be reduced, if not eliminated, by means of so called guard periods, which are periods during which no transmissions may be made, and which are created by "silencing" the last part of a DL subframe, as shown in FIG. 3.

In addition, it can also be mentioned that TDD systems can use a frame of a type known as type 2, which differs slightly from type 1, but which basically also uses the principle of guard periods in order to overcome interference problems.

It is a purpose of the present invention to offer a new frame structure which may be used to replace the existing frames of type 1 and type 2, since it is also desirable to reduce the amount of options, and to have only one type of frame.

A basic idea behind the present invention is to let a subframe comprise three parts, one of which is used for uplink traffic, one of which is used for downlink traffic, and one of which is used as a guard period. Suitably, the "guard period part" is placed between the "uplink part" and the "down link part".

By means of the invention, as will emerge from the more detailed description below, it will be possible for an LTE system which uses TDD or half duplex FDD to coexist in a better way than hitherto with other LTE TDD systems as well as with 3G TDD systems such as TD-SCDMA, or with WiMax systems.

As opposed to UTRA TDD and LTE TDD systems, in which subframes can be allocated to uplink or to downlink, the present invention makes it possible to allocate, for example, the first part of a subframe to downlink transmission and the last part of a subframe to uplink transmission. The DL part of an inventive subframe will be referred to as DwPTS, and the UL part of the inventive subframe will be referred to as UpPTS.

Figure 4:
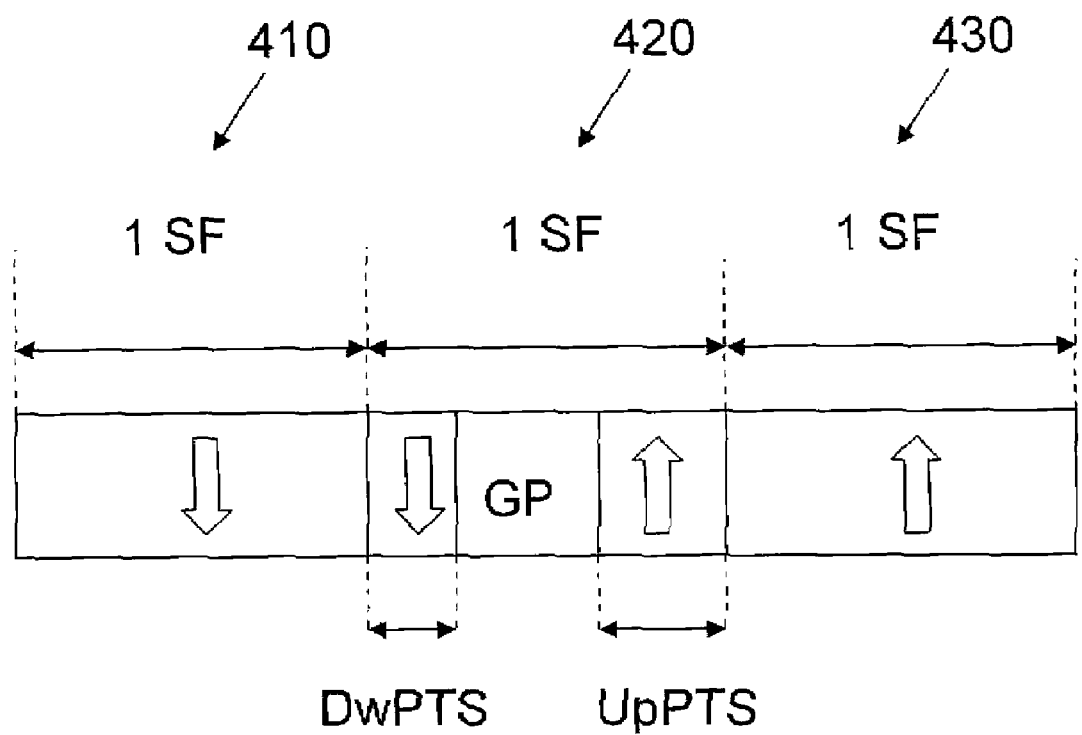
FIG. 4 shows a subframe of the invention.

FIG. 4 shows a subframe 420 of the invention, flanked by a DL subframe 410 and an UL subframe 420. As shown in FIG. 4, in the inventive subframe 420, between the two UL/DL periods, i.e. DwPTS and UpPTS, a guard period, GP, of varying length may thus be configured. The duration of the GP of the inventive subframe will be based on a number of parameters, one of which may be the maximum roundtrip propagation time in a cell, the so called RTT, so that the GP in such a case will be based on the size of the cell.

As compared to the current situation, a prior art subframe (LTE TDD Type 2) may only contain DwPTS and GP. This may lead to significant efficiency losses, which can be avoided by the subframe of the invention, since the invention allows for the use of part of the subframe for uplink transmissions as well, i.e. the UpPTS part.

The total sum of the durations of the DwPTS, UpPTS and the GP constitute the total subframe length, which is a difference as compared to the LTE TDD frame structure type 2, and also as compared to the frame structure used in systems which use TD-SCDMA, Time Division Synchronous Code Multiple Access.

Another improvement of the invention over the LTE TDD frame structure type 2 is that the length of the different parts can be varied, for example according to the need for a guard period based on the maximum roundtrip propagation time in the cell and requirements of co-existence with co-located or adjoining cells of other systems, as well as a need to adapt the capacity need between UL and DL on a finer scale than previously possible.

Turning now to the LTE TDD frame structure type 1, a difference with regard to the inventive subframe is that part of the subframe of the invention may be used for uplink transmission. Currently, in the LTE TDD frame Type 1, a subframe allocated to DL may only be used for DL transmission, and may possibly also contain an "idle" guard part, i.e. a part that is not used for transmissions. A difference between the subframe of the invention and the LTE TDD Type 1 frame is thus that in the subframe of the invention, UL data can be transmitted as well.

The subframe of the invention is suitably placed following a period of DL subframes and before a period of UL subframes,. i.e. at a transition from DL to UL. The DL part of the inventive subframe is in such an application placed first in the subframe.

In another embodiment, the subframe of the invention can be placed following a period of UL subframes and before a period of DL subframes, i.e. at a transition from UL to DL. The UL part of the inventive subframe is in such an application placed first in the subframe.

Hence, at least two of the three parts of the inventive subframe can be varied to fit the system needs, since, if two parts are varied, the third part will naturally be determined by what is left over of the sub frame.

If the guard period, the GP, is one of the parts which is varied, it may be varied with respect to at least one of the following parameters:

1. Interference from or with other cells in the same system, or other cells in other adjoining or co-located systems,
2. The size of the cell, which determines the maximum propagation round trip time, RTT, in the cell,
3. The modulation scheme used for traffic in the cell.

In case 1 above, i.e. when the guard period is varied with respect to the interference from or with other cells in the system, the duration of the GP may suitably be determined so that it is adapted to be at least equal to the propagation time of signals from or to at least one controlling node in another cell in the system.

Suitably, at least one of the parts for uplink traffic, downlink traffic, and guard period is varied freely, i.e. without discrete steps, according to the needs of the system. However, in case 3 above, i.e. when the duration of the guard period is varied according to the modulation scheme used for traffic in the cell, if the system is one which uses an OFDM modulation method, Orthogonal Frequency Division Modulation, then at least one of the uplink traffic, UpPTS, and downlink parts, DwPTS, may be given a duration which corresponds to an integer amount of OFDM symbols in the modulation method. Suitably, the UpPTS and DwPTS are given a length of 1 or 2

OFDM symbols, although other OFDM symbol lengths can also be envisioned within the scope of the present invention.

Hence, the invention will facilitate harmonization of the two frame structures in present day LTE TDD systems into a single frame structure which is harmonized with LTE FDD frame structures, which will be beneficial at the present stage in 3GPP standardization, or at a later stage, as LTE evolves into the so called IMT (International Mobile Telecommunications) Advanced.

The invention also solves some drawbacks of present day LTE solutions, namely in that it:
  allows for a finer granularity when it comes to allocating resources to UL and DL, as well as allowing for increased flexibility when it comes to creating guard periods.
  Allows for increased flexibility when creating UL and DL period lengths, which is beneficial from a perspective of co-existence with TD-CDMA systems, as well as with TD-SCDMA and WiMAX systems.

Figure 5:
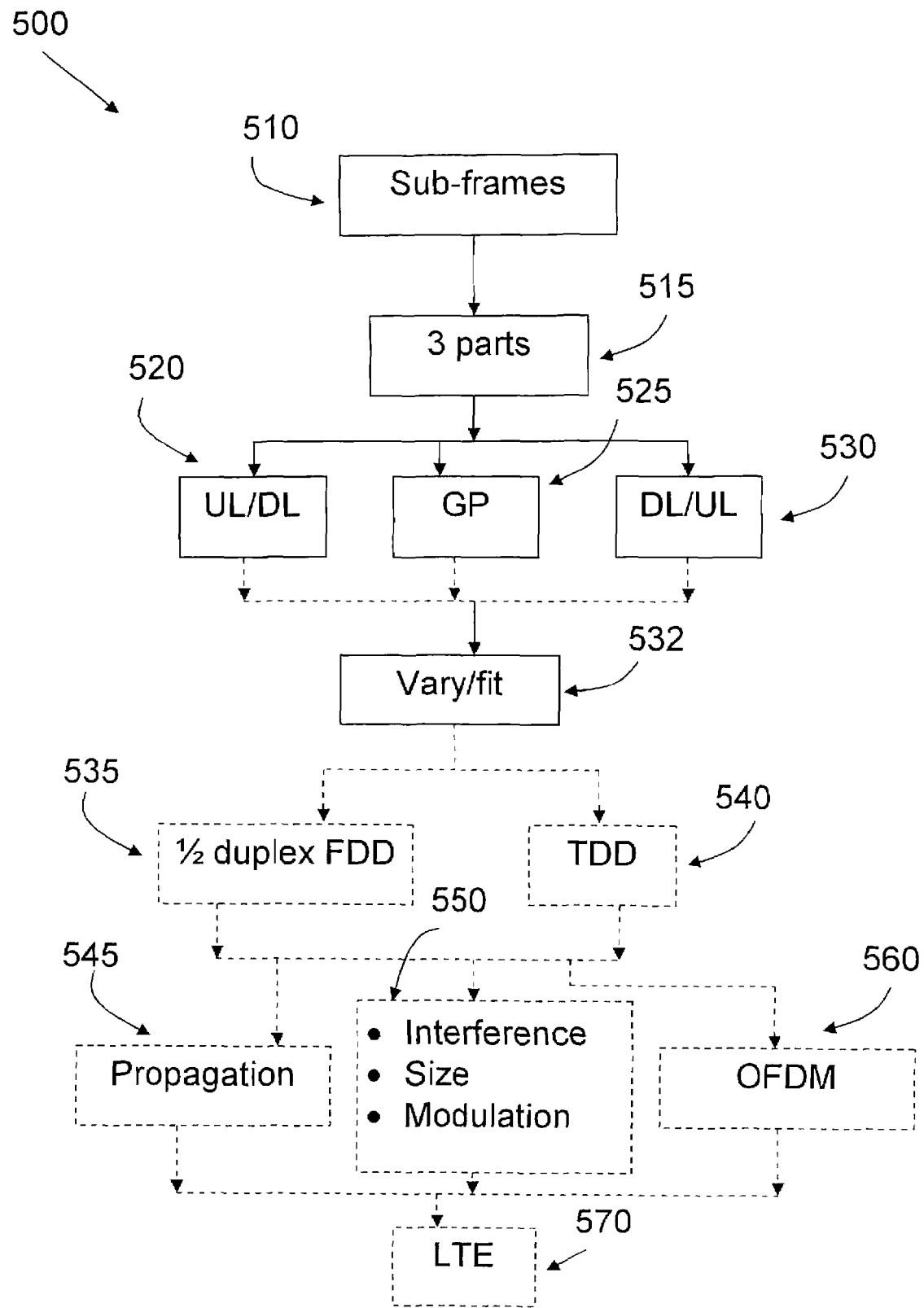
FIG. 5 shows a flow chart of a method of the invention.

FIG. 5 shows a rough flow chart of a method 500 of the invention. Steps which are options or alternatives are shown with dashed lines.

As has emerged from the description above, the method of the invention is intended for use in a cellular communications system, in which traffic in a cell is sent in frames, and where each frame comprises a first number of subframes.

A second number of the subframes are available for at least either uplink or downlink traffic, and as shown in step 510, at least one of said second number of subframes is made to comprise at least three parts, as shown in step 515, as follows:
  One part which is utilized for uplink traffic, step 520,
  One part which is utilized for downlink traffic, step 525,
  One part which is utilized as a guard period, step 530.

The guard period part of step 525 is scheduled between the uplink and the downlink parts, and as shown in step 532, the duration of at least two of the three parts of steps 520, 525 and 530 may be varied to fit the current system need.

As indicated in step 540, the method of the invention may suitably be applied to a TDD-system, Time Division Duplex, i.e. a system with an unpaired spectrum, so that uplink and down link traffic in at least a first plurality of cells in the system occur during different subframes, but on the same frequency.

However, as indicated in step 535, the method of the invention may also be applied to a half duplex FDD-system, Frequency Division Duplex, so that uplink and down link traffic in at least a first plurality of cells in the system occur during different subframes, and on different frequencies.

As shown in step 550, in one embodiment of inventive method, the guard period is one of said at least two of three parts, and the guard period is varied in duration with respect to at least one of the following parameters:
  Interference from or with other cells in the same system, or other cells in other adjoining or co-located systems,
  The size of the cell, which determines the maximum propagation round trip time, RTT, in the cell,
  The modulation scheme used for traffic in the cell.

As shown in step 545, the guard period may also be varied with respect to the interference from or with other cells in the system, so that the duration of the guard period is adapted to be at least equal to the propagation time of signals from at least one controlling node in another cell in the system.

In one embodiment, as shown in step 560, the inventive method may be applied in a system in which an OFDM modulation method, Orthogonal Frequency Division Modulation is used in at least one of the uplink and downlink directions, and at least one of the uplink traffic and downlink parts in said second number of subframes is given a duration which corresponds to an integer number of OFDM symbols in the modulation method.

Also, in a further embodiment of the method of the invention, the subframe which is made to comprise at least three parts is interposed after a subframe used for downlink traffic and is followed by a subframe which is used for uplink traffic, with the downlink part being first in said subframe.

However, in an alternative embodiment, the inventive subframe which is made to comprise at least three parts is interposed after a subframe used for uplink traffic and is followed by a subframe which is used for downlink traffic, with the uplink part being first in said subframe.

As shown in step 570, the method of the invention can be applied to an LTE system, Long Term Evolution.

Figure 6:
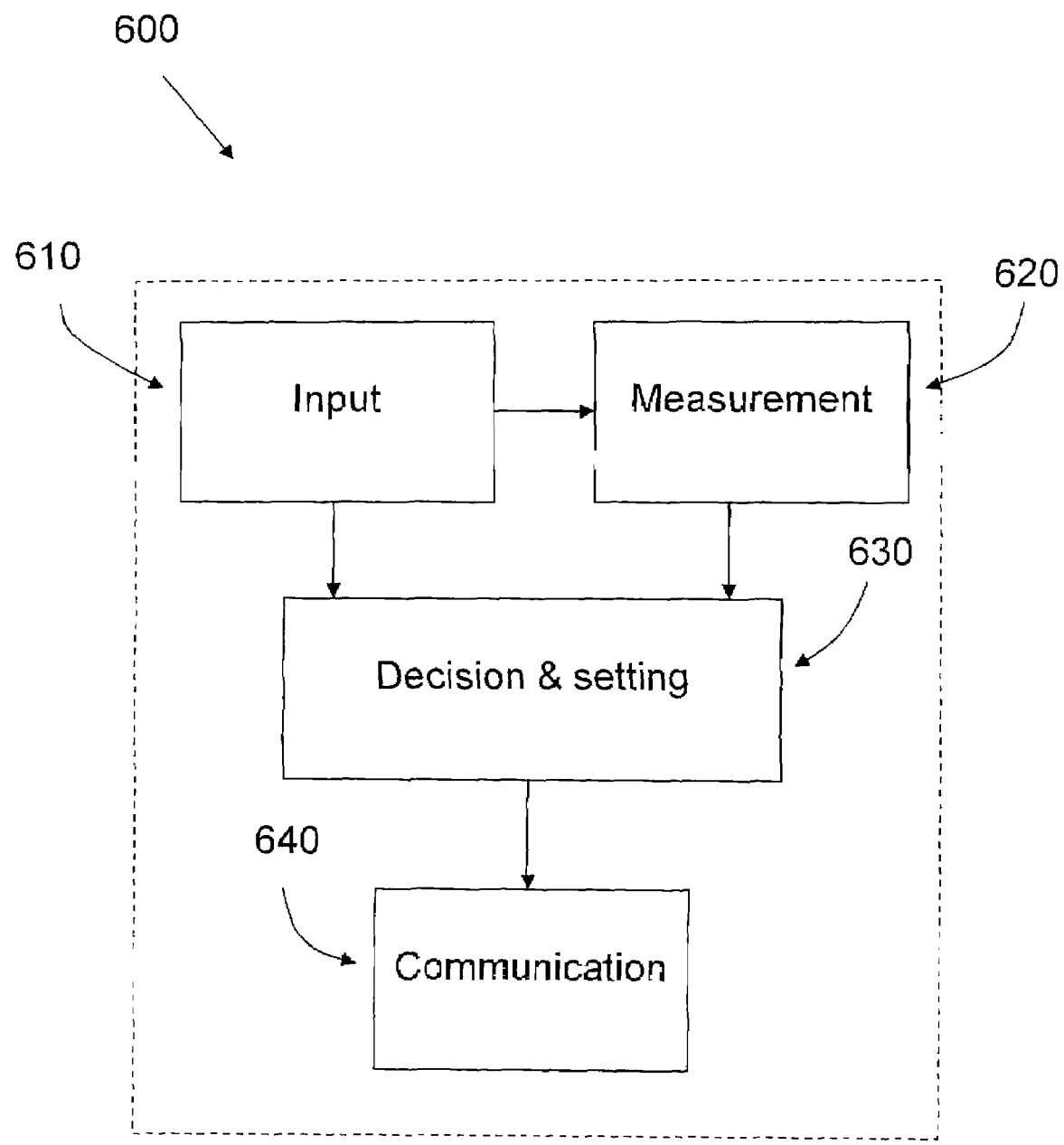
FIG. 6 shows a block scheme of a first transceiver of the invention.

FIG. 6 shows a block diagram of some parts of a first transceiver 600 which is intended for use as a controlling node in a system of the invention. With retained use of the exemplary LTE terminology, the transceiver 600 will be referred to as an eNodeB. Since the eNodeB of the invention works basically according to the method which has been described above, all of the details of the operation of the eNodeB will not be repeated again here.

The decision or decisions regarding the details of the inventive subframe 420, such as, for example, the duration of the three parts, the DwPTS, the GP and the UpPTS, can be decided in a number of different ways in a system of the invention. For example, the decision can be taken by the operator of the system, and simply forwarded to the eNodeB 600. In order to open for this possibility, the eNodeB will comprise input means 610 for receiving such decisions. The input means 610 are suitably an interface towards another, "higher" node in the system, via which the eNodeB communicates with the system.

The decision from the operator of the system can also be to let the eNodeB decide the particulars of the inventive subframe in a more or less autonomous manner. For example, the eNodeB can be instructed to decide the particulars of the inventive subframe in a completely autonomous manner, based on, for example, interference measurements which the eNodeB carries out. To open up for such a possibility, the eNodeB comprises measurement means 620, which can measure the interference in the cell.

A third possibility is that the operator instructs the eNodeB to decide the particulars of the inventive subframe in a semi-autonomous manner, e.g. based on interference measurements, but with certain conditions which are laid down by the operator, such as, for example, that the duration of one of the three parts, the DwPTS, the GP and the UpPTS, may not exceed or be shorter than a certain specified period of time.

Regardless of how the particulars of the inventive subframe are arrived at by the eNodeB 600, the eNodeB 600 will comprise means 630 for taking a decision to arrive at these particulars. As shown in FIG. 6, this decision making means 630 can receive information both from the input means 610 and the measurement means 620. The decision means 630 will also suitably carry out the actual setting of the particulars of the inventive subframe in the eNodeB 600. Suitably, the decision and setting means will comprise a microcomputer or some similar computing component.

In addition, the eNodeB 600 will also need to communicate the details of the inventive subframe to the UEs in the cell, as well as to UEs which are on their way in to the cell, i.e. UEs in a so called "hand over procedure", and also to UEs which are turned on in the cell, i.e. UEs which have entered the cell with their power turned off, and which are switched on in the cell. For this reason, the eNodeB 600 is shown as comprising communication means 640, which will suitably comprise a transmitter and an antenna, which are normally comprised in an eNodeB for communication with the UEs in a cell.

Thus, the information regarding the inventive subframe which the eNodeB communicates to the UEs in the cell will comprise the duration of the different parts of the subframe of the invention, i.e. the DwPTS, GP and UpPTS. One preferred method of signaling this information to the UEs in a cell is to use the channel known as BCH, the "Broadcast Channel", although the information may in principle be communicated to the UEs via other control channels in the system.

Figure 7:
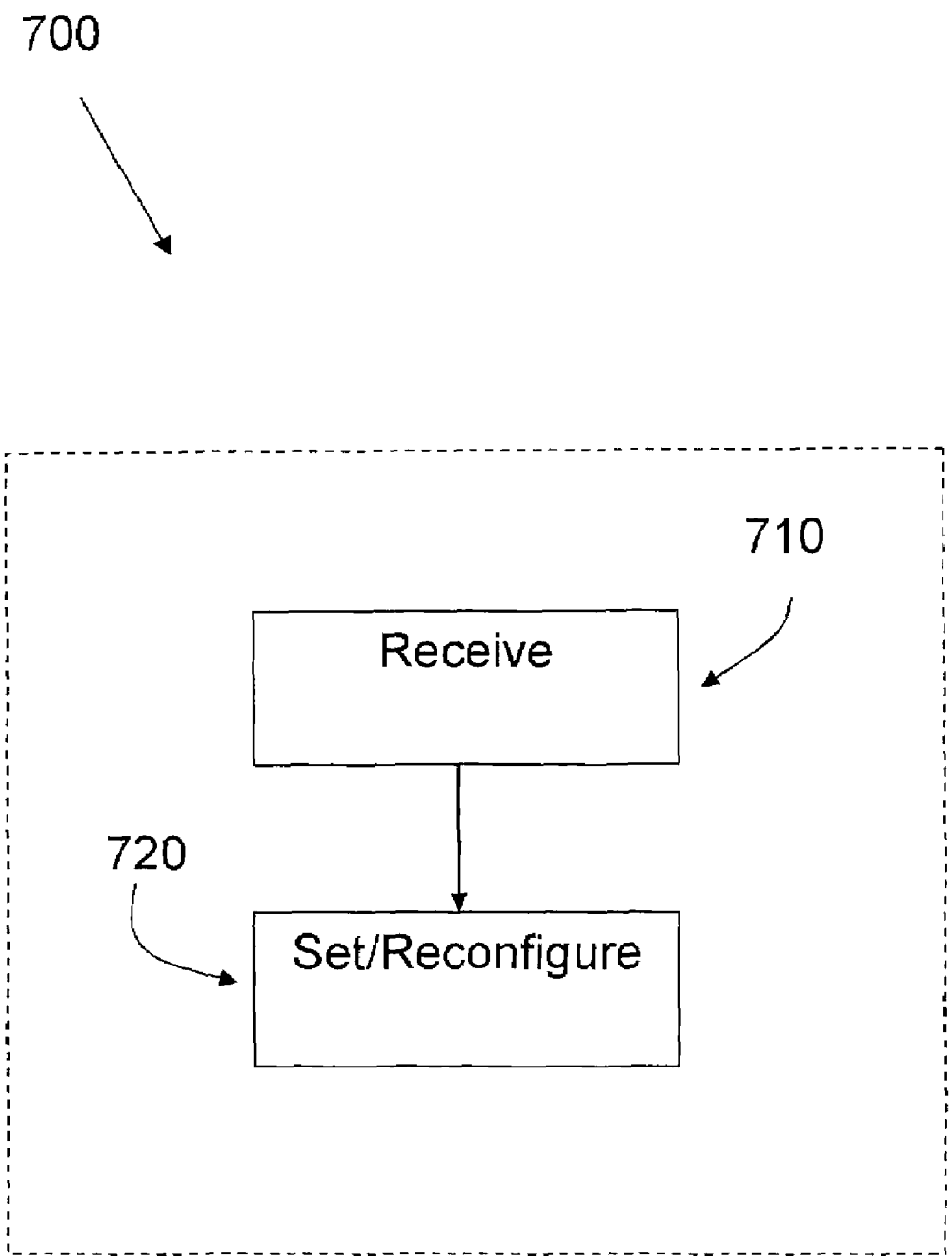
FIG. 7 shows a block scheme of a second transceiver of the invention.

FIG. 7 shows a block diagram of some parts of a second transceiver 700 of the invention, which is intended for use as a user terminal (telephone/portable computer etc) in a system of the invention. With retained use of the exemplary LTE terminology, the transceiver 700 will be referred to as a UE, "User Equipment". Since the UE of the invention works basically according to the method which has been described above, all of the details of the operation of the UE will not be repeated again here.

The UE 700 of the invention is, as is indicated in FIG. 7, equipped with means for receiving instructions from the eNodeB of the cell regarding the duration of the three parts of the inventive subframe, i.e. the DwPTS, the GP and the UpPTS. Suitably, these instructions are received via the same means as other communication from the eNodeB, i.e. via a receiver and an antenna of the UE.

The instructions which are received from the eNodeB are then processed by the UE, i.e. the UE is set to those values of the DwPTS, GP and UpPTS. This is done by means 720 for setting or reconfiguring the DwPTS, GP and UpPTS in the UE. The setting and/or reconfiguration means will suitably comprise microcomputer or some similar computing component.

In conclusion, the invention facilitates harmonization of the two frame structures in LTE for TDD into a single frame structure which can be given a subframe duration of 1 ms. In addition, the invention also solves a number of drawbacks of present solutions, for example:

Allows for increased flexibility in creating of UL and DL period lengths, which is beneficial from co-existences perspective with TD-CDMA as well as TD-SCDMA and WiMAX.

Allows fine granularity when it comes to allocating resources to UL and DL, as well as increased flexibility when creating guard periods.

Another principle which may be used is so called half duplex FDD, Frequency Division Duplex, in which uplink and downlink transmissions from one and the same terminal in the system occur on different frequencies and during different intervals in time, such as the previously mentioned subframes. The invention can also be applied in such a system, i.e. a half duplex FDD system.

The invention is not limited to the examples of embodiments described above and shown in the drawings, but may be freely varied within the scope of the appended claims.

We claim:

1. A radio transceiver comprising:

a transmitter and a receiver, said transmitter and said receiver being configured to send and receive radio frames, respectively, at least some of said radio frames including at least one downlink subframe which contains downlink traffic but no uplink traffic, at least one uplink subframe which contains uplink traffic, but no downlink traffic and, disposed between said at least one downlink subframe and said at least one uplink subframe, a special subframe, said special subframe consisting of:

a first part which is utilized for downlink traffic;

a second part which is utilized as a guard period; and a third part which is utilized for uplink traffic;

wherein said guard period of said second part is entirely disposed between the first part and the third part;

such that a sum of a duration of the first part, the second part and the third part constitute an entire subframe length;

wherein a duration of at least two of said first part, said second part and said third part may be varied.

2. The transceiver of claim 1, additionally being equipped with means for receiving information from an external source in the system regarding the varying of said three parts.

3. The transceiver of claim 1, being equipped with means for transmitting to users in a cell of the system information regarding the duration of said three parts.

4. The transceiver of claim 1, adapted to be used in a TDD-system, Time Division Duplex, i.e., a system which uses an unpaired spectrum, so that uplink and downlink traffic occur during different subframes.

5. The transceiver of claim 4, adapted to be used on the same frequency for both uplink and downlink traffic.

6. The transceiver claim 1, adapted to be used in a half duplex FDD-system, Frequency Division Duplex, so that uplink and downlink traffic for one and the same user occur during different subframes, and on different frequencies.

7. The transceiver of claim 1, in which the guard period is one of said at least two of three parts, and is equipped with means for varying the guard period in duration with respect to at least one of the following parameters:

Interference from or with other cells in the same system, or other cells in other adjoining or co-located systems, The size of the cell, which determines the maximum propagation round trip time, RTT, in the cell, The modulation scheme used for traffic in the cell.

8. The transceiver of claim 7, adapted to vary the guard period with respect to the interference from or with other cells in the system, so that the duration of the guard period is adapted to be at least equal to the propagation time of signals from at least one controlling node in another cell in the system.

9. The transceiver of claim 1, being adapted for use in a system in which an OFDM modulation method, Orthogonal Frequency Division Modulation is used in at least one of the uplink and downlink directions, being equipped with means for giving at least one of the uplink traffic and downlink parts in said special subframe a duration which corresponds to an integer number of OFDM symbols in the modulation method.

10. The transceiver of claim 1, which comprises means for interposing said special subframe which consists of at least three parts after said at least one downlink subframe used for downlink traffic and before said at least one uplink subframe which is used for uplink traffic, with the downlink part being first in said special subframe.

11. The transceiver of claim 1, which comprises means for interposing said special subframe which consists of at least three parts after said at least one uplink subframe used for uplink traffic and before said at least one downlink subframe which is used for downlink traffic, with the uplink part being first in said special subframe.

12. The transceiver of claim 1, applied to an LTE system, Long Term Evolution.

13. A method for transmitting traffic in frames in a cellular communication system, the method comprising:

dividing said frames into a plurality of subframes, said plurality of subframes including at least one downlink subframe which contains downlink traffic but no uplink traffic, and at least one uplink subframe which contains uplink traffic but no downlink traffic;

transmitting said at least one downlink subframe and said at least one uplink subframe; and transmitting, between said at least one downlink subframe and said at least one uplink subframe, a special subframe consisting of:
- a first part which is utilized for downlink traffic;
- a second part which is utilized as a guard period; and
- a third part which is utilized for uplink traffic;

wherein said guard period of said second part is entirely disposed between the first part and the third part;

such that a sum of a duration of the first part, the second part and the third part constitute an entire subframe length, and wherein a duration of at least two of said first part, said second part and said third part may be varied.

14. The method of claim 13, applied to a TDD-system, Time Division Duplex, i.e. a system which uses an unpaired frequency spectrum, so that uplink and downlink traffic in at least a first plurality of cells in the system occur during different subframes.

15. The method of claim 14, in which the uplink and the downlink traffic occur on the same frequency.

16. The method of claim 13, applied to a half duplex FDD-system, Frequency Division Duplex, so that uplink and downlink traffic for one and the same user in at least a first number of cells in the system occur during different subframes, and on different frequencies.

17. The method of claim 13, according to which the guard period is one of said at least two of three parts, and according to which method the guard period is varied in duration with respect to at least one of the following parameters:

Interference from or with other cells in the same system, or other cells in other adjoining or co-located systems, The size of the cell, which determines the maximum propagation round trip time, RTT, in the cell, The modulation scheme used for traffic in the cell.

18. The method of claim 17, according to which the guard period is varied with respect to the interference from or with other cells in the system so that the duration of the guard period is made at least equal to the propagation time of signals from at least one controlling node in another cell in the system.

19. The method of claim 13, according to which the system is one in which an OFDM modulation method, Orthogonal Frequency Division Modulation is used in at least one of the uplink and downlink directions, and in which at least one of the uplink traffic and downlink parts in said special subframe is given a duration which corresponds to an integer number of OFDM symbols in the modulation method.

20. The method of claim 13, according to which said special subframe which is made to consist of three parts is interposed after said at least one downlink subframe used for downlink traffic and is followed by said at least one uplink subframe which is used for uplink traffic, with the downlink part being first in said special subframe.

21. The method of claim 13, according to which said special subframe which is made to consist of three parts is interposed after said at least one uplink subframe used for uplink traffic and is followed by said at least one downlinksubframe which is used for downlink traffic, with the uplink part being first in said special subframe.

22. The method of claim 13, applied to an LTE system, Long Term Evolution.

* * * * *

UNITED STATES PATENT AND TRADEMARK OFFICE
CERTIFICATE OF CORRECTION

| | | |
|---|---|---|
| PATENT NO. | : 7,986,681 B2 | Page 1 of 1 |
| APPLICATION NO. | : 12/047921 | |
| DATED | : July 26, 2011 | |
| INVENTOR(S) | : Astely et al. | |

It is certified that error appears in the above-identified patent and that said Letters Patent is hereby corrected as shown below:

On the title page, below item (65), insert item -- (30) Foreign Application Priority Data
Sep. 14, 2007 (SE) 0702066-2 --.

In Column 8, Line 26, in Claim 6, delete "transceiver claim" and insert -- transceiver of claim --, therefor.

In Column 10, Line 28, in Claim 21, delete "downlinksubframe" and insert -- downlink subframe --, therefor.

Signed and Sealed this
Thirty-first Day of January, 2012

David J. Kappos
*Director of the United States Patent and Trademark Office*